United States Patent
Kuroiwa et al.

(10) Patent No.: US 8,734,110 B2
(45) Date of Patent: May 27, 2014

(54) WIND TURBINE BLADE

(75) Inventors: Takao Kuroiwa, Tokyo (JP); Hideyasu Fujioka, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/397,294

(22) Filed: Feb. 15, 2012

(65) Prior Publication Data
US 2013/0149154 A1    Jun. 13, 2013

Related U.S. Application Data

(63) Continuation of application No. PCT/JP2011/078602, filed on Dec. 9, 2011.

(51) Int. Cl.
*F03D 11/00*    (2006.01)

(52) U.S. Cl.
USPC .............. 416/146 R; 416/224; 416/229 R

(58) Field of Classification Search
USPC .................. 416/146 R, 224, 229 R
See application file for complete search history.

(56) References Cited

U.S. PATENT DOCUMENTS

| | | | |
|---|---|---|---|
| 4,424,410 A * | 1/1984 | Edgerton | 174/73.1 |
| 6,407,900 B1 | 6/2002 | Shirakawa | |
| 6,457,943 B1 * | 10/2002 | Olsen et al. | 416/230 |
| 6,612,810 B1 | 9/2003 | Olsen | |
| 6,979,179 B2 | 12/2005 | Moller Larsen | |
| 7,364,407 B2 | 4/2008 | Grabau et al. | |
| 7,377,750 B1 | 5/2008 | Costin | |
| 7,427,189 B2 | 9/2008 | Eyb | |
| 7,502,215 B2 | 3/2009 | Krug | |
| 7,766,620 B2 | 8/2010 | Stam | |
| 7,883,321 B2 | 2/2011 | Bertelsen | |
| 7,988,415 B2 * | 8/2011 | Hardison et al. | 416/61 |

(Continued)

FOREIGN PATENT DOCUMENTS

| | | |
|---|---|---|
| DE | 4436197 A1 | 4/1996 |
| DE | 19501267 A1 | 8/1996 |

(Continued)

OTHER PUBLICATIONS

International Search Report for PCT/JP2011/078602, dated Mar. 13, 2012.

(Continued)

*Primary Examiner* — Edward Look
*Assistant Examiner* — Aaron R Eastman
(74) *Attorney, Agent, or Firm* — Kanesaka Berner & Partners, LLP

(57) ABSTRACT

A wind turbine blade having a lightning protection function includes an outer shell, a spar arranged in a space inside the outer shell, a spar cap which is formed by a carbon-fiber plastic laminated member disposed on a blade root side and a glass-fiber plastic laminated member disposed on a blade tip side that are connected together, the spar cap supporting the spar to the outer shell, and a lightning protection unit. The lightning protection unit includes a receptor for receiving lightning which is provided in the outer shell on a side where the glass-fiber plastic laminated member is arranged, a down conductor which directs lightning current received by the receptor into the ground or the water, and a conductive metal member which covers the outer shell on a side where the carbon fiber plastic laminated member is arranged.

14 Claims, 4 Drawing Sheets

(56) References Cited

U.S. PATENT DOCUMENTS

| | | | |
|---|---|---|---|
| 2005/0180854 A1* | 8/2005 | Grabau et al. | 416/241 R |
| 2007/0081900 A1 | 4/2007 | Nies | |
| 2007/0140861 A1 | 6/2007 | Wobben | |
| 2008/0145229 A1 | 6/2008 | Llorente Gonzalez | |
| 2009/0053062 A1* | 2/2009 | Arinaga et al. | 416/146 R |
| 2009/0139739 A1 | 6/2009 | Hansen | |
| 2010/0047074 A1* | 2/2010 | Hernandez et al. | 416/230 |
| 2010/0296941 A1* | 11/2010 | Zuteck | 416/226 |
| 2010/0329865 A1* | 12/2010 | Hibbard | 416/146 R |
| 2010/0329881 A1* | 12/2010 | Mendez Hernandez et al. | 416/230 |
| 2011/0110789 A1 | 5/2011 | Luebbe | |
| 2011/0142643 A1* | 6/2011 | Hardison et al. | 416/146 R |
| 2011/0142661 A1* | 6/2011 | Sambamurty | 416/224 |
| 2011/0171038 A1 | 7/2011 | Esaki et al. | |
| 2011/0182731 A1 | 7/2011 | Naka | |
| 2011/0189025 A1* | 8/2011 | Hancock et al. | 416/226 |
| 2011/0305573 A1 | 12/2011 | Olsen | |
| 2012/0003094 A1* | 1/2012 | Hansen | 416/146 R |

FOREIGN PATENT DOCUMENTS

| | | |
|---|---|---|
| DE | 102004010104 A1 | 9/2005 |
| DE | 102004022299 A1 | 12/2005 |
| DE | 202008005289 U1 | 7/2008 |
| EP | 1036937 A2 | 9/2000 |
| EP | 1282775 B1 | 11/2004 |
| EP | 1522725 A2 | 4/2005 |
| EP | 1568883 A2 | 8/2005 |
| EP | 1607623 A2 | 12/2005 |
| EP | 2019204 A1 | 1/2009 |
| EP | 2122162 | 11/2009 |
| EP | 2267280 A2 | 12/2010 |
| EP | 2336559 A1 | 6/2011 |
| EP | 2336560 A1 | 6/2011 |
| JP | 2000-265938 A | 9/2000 |
| JP | 2002-227757 | 8/2002 |
| JP | 2006-070879 | 3/2006 |
| JP | 2007-077889 | 3/2007 |
| JP | 2007-170268 | 7/2007 |
| JP | 2007170268 A | 7/2007 |
| JP | 2008-115783 | 5/2008 |
| JP | 4192744 B2 | 12/2008 |
| JP | 200930597 A | 2/2009 |
| JP | 4355793 | 8/2009 |
| JP | 2009-292398 | 12/2009 |
| JP | 2009-292461 | 12/2009 |
| JP | 4648315 B2 | 3/2011 |
| JP | 2011137386 A | 7/2011 |
| JP | 2011-163132 | 8/2011 |
| JP | 2012-117446 | 6/2012 |
| JP | 2012-117447 | 6/2012 |
| JP | 2012-117448 | 6/2012 |
| WO | 03093672 A1 | 11/2003 |
| WO | 2005-031158 A2 | 4/2005 |
| WO | 2007-072961 A1 | 6/2007 |
| WO | 2008-101506 A2 | 8/2008 |
| WO | 2009-056121 A2 | 5/2009 |
| WO | 2009-130143 A2 | 10/2009 |
| WO | 2010-100283 A1 | 9/2010 |
| WO | 2010-119027 A2 | 10/2010 |
| WO | 2010-125160 A1 | 11/2010 |
| WO | 2011-069686 A1 | 6/2011 |
| WO | 2011-072821 A2 | 6/2011 |
| WO | 2011-072822 A2 | 6/2011 |
| WO | 2011-077970 A1 | 6/2011 |
| WO | 2011-080177 A1 | 7/2011 |
| WO | 2011-096500 A1 | 8/2011 |
| WO | 2011-110492 A2 | 9/2011 |
| WO | 2012-016568 A2 | 2/2012 |
| WO | 2012-016589 A1 | 2/2012 |
| WO | 2012-016726 A2 | 2/2012 |

OTHER PUBLICATIONS

International Search Report Dated Mar. 13, 2012 Issued in PCT/JP2011/078602.
International Search Report Dated Sep. 14, 2012 Issued in PCT/JP2012/001310.
International Search Report Dated Nov. 26, 2012 Issued in PCT/JP2012/004862.
International Search Report and Written Opinion Dated Jan. 29, 2013 Issued in PCT/JP2012/078434.

* cited by examiner

WIND TURBINE BLADE

RELATED APPLICATIONS

The present application is a Bypass continuation of International Application Number PCT/JP2011/078602, filed on Dec. 9, 2011, the disclosure of which is hereby incorporated by reference herein in its entirety.

TECHNICAL FIELD

The present invention relates to a wind turbine blade which for a wind turbine generator.

BACKGROUND ART

In recent years, from a perspective of preserving the environment, it is becoming popular to use a wind turbine generator generating power from wind power. In a wind turbine generator, generally, a nacelle is supported by an upper part of a tower and a blade mounted to a hub is supported rotatably by the nacelle. In such wind turbine generator, motion energy of the wind is converted into the rotation energy of the blade (specifically, the entire rotor including the blade) and the rotation energy of the rotor is converted into electric power by the generator.

The wind turbine blade used for the above wind turbine generator, is desired to be lightweight to be supported at the top of the tower and is desired to have high strength to be subjected to the wind. This, fiber-reinforced plastic is often used for the parts constituting the wind turbine blade. The wind turbine blade conventionally includes, for instance, an outer shell formed of reinforced-fiber plastic, spar caps (a main reinforcement member) arranged on a suction side and a pressure side of the outer shell, and a shear web (a spar member) arranged between the spar caps.

As a conventional wind turbine blade, disposed in Patent Literature 1 is a wind turbine blade having a reinforcement member extending in a longitudinal direction of the blade and a shear web. The reinforcement member of the wind turbine blade is constituted of a part formed of carbon-fiber plastic and a part formed of glass-fiber plastic in the longitudinal direction. For instance, the part formed of glass-fiber plastic is arranged on a root side of the blade and the part formed of carbon-fiber plastic is arranged on a tip side of the blade (see FIG. 3). Generally, carbon-fiber plastic has higher strength than glass-fiber plastic. By using two different types of plastic materials for the reinforcement member as described above, the blade can be configured with high strength at low cost.

In Patent Literature 2, the wind turbine blade includes a part of the outer shell on the blade tip side is formed of a first fiber-containing polymer and a part of the outer shell on the blade root side is formed of a second fiber-containing polymer (see FIG. 2). For instance, a combination of the first fiber-containing polymer and the second fiber-containing polymer may be a combination of carbon-fiber plastic and glass-fiber plastic. To obtain enough strength in a transition zone between different materials, boundary surfaces where the carbon-fiber plastic is replaced by glass-fiber plastic may be displaced in relation to the other faces in a blade-cross-section (see FIG. 5).

As described above, the wind turbine blade is desired to be lightweight and have high strength. In addition to those, the wind turbine blade is desired to have lightning protection as the wind turbine blade is arranged at a high place on top of the tower and is easily subjected to lightning. In view of this, Patent Literature 3 proposes a lightning protection device having a lightning receptor on a surface of the wind turbine blade. The lightning protection device grounds lightning current via a connection device such as a conductive wire.

CITATION LIST

Patent Literature

[PTL 1]
WO 2003/093672 A
[PTL 2]
U.S. Pat. No. 7,364,407 B
[PTL 3]
JP 2007-170268 A

SUMMARY OF INVENTION

Technical Problem

As described above, the wind turbine blade is desired to be lightweight and have high-strength as well as excellent lightning protection. However, it was difficult to produce a wind turbine blade having all of the above characteristics. For instance, the wind turbine blade may be configured as described in Patent Literature 1 such that the blade tip side is formed of carbon-fiber plastic so as to achieve lightweight and high-strength of the blade. However, the blade tip side is susceptible to lightning and the use of carbon-fiber plastic which with conductive property increases the chance of lightening hitting the carbon-fiber plastic forming the blade tip side of the blade. When the lightning strikes the carbon fiber plastic, electric current flows along the carbon-fiber plastic and the blade is likely to be extensively damaged. Furthermore, it is harder to repair the carbon-fiber plastic than the glass-fiber plastic.

As one example shown in Patent Literature 2, the outer shell may be formed of the glass-fiber plastic on the blade tip side and of the carbon-fiber plastic on the blade root side so as to reduce the chance of lightning strikes. However, the carbon-fiber plastic is exposed to the outer surface of the blade and it is unavoidable that lightning may strike the carbon fiber plastic directly, which leads to damaging the wind turbine blade. Further, by suing on the outer shell a large amount of the carbon-fiber plastic, which is expensive, the production cost of the wind turbine blade rises.

In Patent Literature 3, elements besides the lightning protection, i.e. reduction in weight and enhancement of the strength are not mentioned.

In view of the above issues, it is an object of the present invention to provide a wind turbine blade, which is lightweight and has high-strength and superior lightning protection.

Solution to Problem

As an aspect of the present invention, a wind turbine blade having a lightning protection function may include, but is not limited to:
an outer shell;
a spar arranged in a space inside the outer shell and extends in a longitudinal direction of the blade;
a spar cap which is formed by a carbon-fiber plastic laminated member disposed on a blade root side and a glass-fiber plastic laminated member disposed on a blade tip side that are connected together, said spar cap supporting the spar to the outer shell; and
a lightning protection unit.

The lightning protection unit may include, but is not limited to:

a receptor for receiving lightning which is provided in the outer shell on a side where the glass-fiber plastic laminated member is arranged;

a down conductor which directs lightning current received by the receptor into the ground or the water; and a conductive metal member which covers the outer shell on a side where the carbon fiber plastic laminated member is arranged.

According to the wind turbine blade, the blade root side of the spar cap is formed of the carbon-fiber plastic having high strength and light weight and the blade tip side of the spar cap is formed of the glass-fiber plastic laminated body whose strength is not as high as the carbon-fiber plastic but is high to a certain degree and which is less likely to attract lightning strikes. In this manner, it is possible to achieve high strength and light weight of the wind turbine blade and also to improve lightning protection of the wind turbine blade. Particularly, the carbon-fiber plastic is easily damaged by lightning strike. Thus, by arranging the carbon-fiber plastic in the area other than the blade tip part which is more subjected to lightning, the wind turbine blade is protected from damage even when lightning strikes.

Further, the carbon-fiber plastic normally has high strength and is expensive. Thus, by using the carbon-fiber plastic only in the blade root side of the spar cap where strength is most required in the wind turbine blade, it is possible to reduce the production cost while still maintaining the strength of the spar cap.

The spar cap is provided between an end of the shear web and an inner periphery of the outer shell. The spar cap is a main structural member that extends in the longitudinal direction of the wind turbine blade.

In the above wind turbine blade, as the lightning protection unit, the receptor for receiving lightning is provided in the outer shell on the side where the glass-fiber plastic laminated member is arranged. In this manner, by providing the receptor on the blade tip side where lightning is more likely to strike, it is easier to collect the lightning current to the receptors, thereby preventing lightning from striking other parts.

The above lightning protection unit includes a conductive metal member which covers the outer shell on the side where the carbon fiber plastic laminated member is arranged. By this, it is possible to avoid direct lightning strike to the carbon-fiber plastic laminated member, thereby preventing breakage of the carbon-fiber plastic. Furthermore, the lightning current flows along the carbon-fiber plastic and thus, it is possible to prevent the wind turbine blade from being extensively damaged.

In the above wind turbine blade, the glass-fiber plastic laminated member may be connected to the carbon-fiber plastic laminated member at a connection part which is arranged at $1/8$ to $1/2$ of an entire length of the wind turbine blade from a blade tip, the carbon-fiber plastic laminated member being arranged on the blade root side of the connection part.

It is known that in the wind turbine blade, normally lightning is likely to strike a zone between $1/8$ and $1/2$ of the entire length of the wind turbine blade from the blade tip. Thus, by arranging the glass fiber plastic in the zone, it is possible to prevent lightning strike to the carbon-fiber plastic on the blade root side. In such a case that the connection part is arranged less than $1/8$ of the entire length of the wind turbine blade from the blade tip, the carbon-fiber plastic extends to the zone with higher possibility of lightning strikes, which is not preferably. In contrast, in such a case that the connection part is arranged beyond $1/2$ of the entire length of the wind turbine blade from the blade tip, the use of the glass-fiber plastic increases, which interferes with reduction in weight of the wind turbine blade.

In the above wind turbine blade, the receptor may be a conductive disc receptor which is embedded in a vicinity of a blade tip of the wind turbine blade.

Generally, the disc receptor can be installed easily and at low cost. By embedding the disc receptor near the blade tip, the lightning protection unit can be installed to the wind turbine blade easily and at low cost. As the blade tip of the wind turbine blade is more subjected to lightning strikes, the disc receptor may be provided in a zone near the blade tip so as to attract lightning strikes to the receptor. The lightning current is smoothly led through the down conductor into the ground or the water.

Alternatively, the receptor may be a conductive disc receptor which is provided in a surface of the wind turbine blade between a blade tip and a blade root.

By embedding the disc receptor in the surface of the wind turbine blade between the blade tip and the blade root, the lightning protection unit can be installed to the wind turbine blade easily and at low cost.

In such a case that the receptor is a disc receptor, a plurality of the disc receptors may be embedded on a pressure side and a suction side of the wind turbine blade, the plurality of the disc receptors being connected to a base plate provided in the wind turbine blade, and the base plate electronically may connect the plurality of the disc receptors to the down conductor.

By attaching the disc receptors to the base plate and connecting the base plate to the down conductor electrically, it becomes easy to install the disc receptors to the wind turbine blade.

In such a case that the receptor is a disc receptor, the down conductor may be arranged in a tower supporting a hub to which the wind turbine blade is connected and allows the lightning current received by the disc receptors to flow into the ground or the water, and the disc receptors and the base plate may be connected to the down conductor so that heat expansion and heat shrink is absorbed.

In this manner, the disc receptor and the base plate are connected to the down conductor so that the heat expansion and heat shrink can be absorbed. Thus, even when parts in the wind turbine generator thermally expand or shrink due to temperature difference outside and so on, the down conductor is kept electrically connected to the disc receptor and the base plate.

In such case, the down conductor may be connected to one of the base plate and the disc receptors via a heat shrinkable tube which is conductive.

In the above wind turbine blade, the down conductor may be arranged along the spar.

In this manner, by arranging the down conductor along the spar, it is possible to prevent damage to the down conductor caused by oscillation of the down conductor due to the rotation of the wind turbine blade.

In the above wind turbine blade, a plurality of the receptors may be provided, the plurality of the receptors including a rod receptor, the rod receptor may be formed by a base part and a lightning receiving part, the base part may be arranged in the space inside the outer shell in such a state that the base part is fixed to the base plate, and the outer shell of the wind turbine blade may be cut at a blade tip to form an opening at the blade tip, and the lightning receiving part and the base part may be coupled by inserting the lightning receiving part in the opening.

Normally, the rod receptor is attachable in the edge direction of the blade and thus, the rod receptor can be easily arranged at the blade tip of the wind turbine blade. Further, the rod receptor is formed by the base part and the lightning receiving part, and the lightning receiving part is inserted through the opening and connected to the base part fastened to the base plate and thus, the receptor can be installed easily to the wind turbine blade.

In the above case, the rod receptor and the base plate may be coupled together by a conductive fastening member.

By this, while maintaining enough conductivity, the rod receptor can be detachably fixed with respect to the base plate.

In the above wind turbine blade, an abutting position of a connection part between the carbon-fiber plastic laminated member and the glass-fiber plastic laminated member may change gradually in a thickness direction of the wind turbine blade.

Normally, the strength declines at the connection part between different materials. However, by gradually changing the abutting position of the connection part between the carbon-fiber plastic laminated member and the glass-fiber plastic laminated member in the thickness direction, it is possible secure enough strength to prevent deformations such as buckling.

In the above wind turbine blade, the spar cap may be formed by respectively stacking carbon-fiber plastic layers and glass-fiber plastic layers and impregnating the stacked layers with resin to form an integral piece using vacuum impregnation.

Advantageous Effects of Invention

According to present invention as described above, the blade root side of the spar cap is formed of the carbon-fiber plastic having high strength and light weight and the blade tip side of the spar cap is formed of the glass-fiber plastic laminated body whose strength is not as high as the carbon-fiber plastic but is high to a certain degree and which is less likely to attract lightning strikes. In this manner, it is possible to achieve high strength and light weight of the wind turbine blade and also to improve lightning protection of the wind turbine blade. Particularly, the carbon-fiber plastic is easily damaged by lightning strike. Thus, by arranging the carbon-fiber plastic in the area other than the blade tip part which is more subjected to lightning, the wind turbine blade is protected from damage even when lightning strikes.

Further, the carbon-fiber plastic normally has high strength and is expensive. Thus, by using the carbon-fiber plastic only in the blade root side of the spar cap where strength is most required in the wind turbine blade, it is possible to reduce the production cost while still maintaining the strength of the spar cap.

In the above wind turbine blade, as the lightning protection unit, the receptor for receiving lightning is provided in the outer shell on the side where the glass-fiber plastic laminated member is arranged. In this manner, by providing the receptor on the blade tip side where lightning is more likely to strike, it is easier to collect the lightning current to the receptors, thereby preventing lightning from striking other parts.

The above lightning protection unit includes a conductive metal member which covers the outer shell on the side where the carbon fiber plastic laminated member is arranged. By this, it is possible to avoid direct lightning strike to the carbon-fiber plastic laminated member, thereby preventing breakage of the carbon-fiber plastic. Furthermore, the lightning current flows along the carbon-fiber plastic and thus, it is possible to prevent the wind turbine blade from being extensively damaged.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

Figure 1:
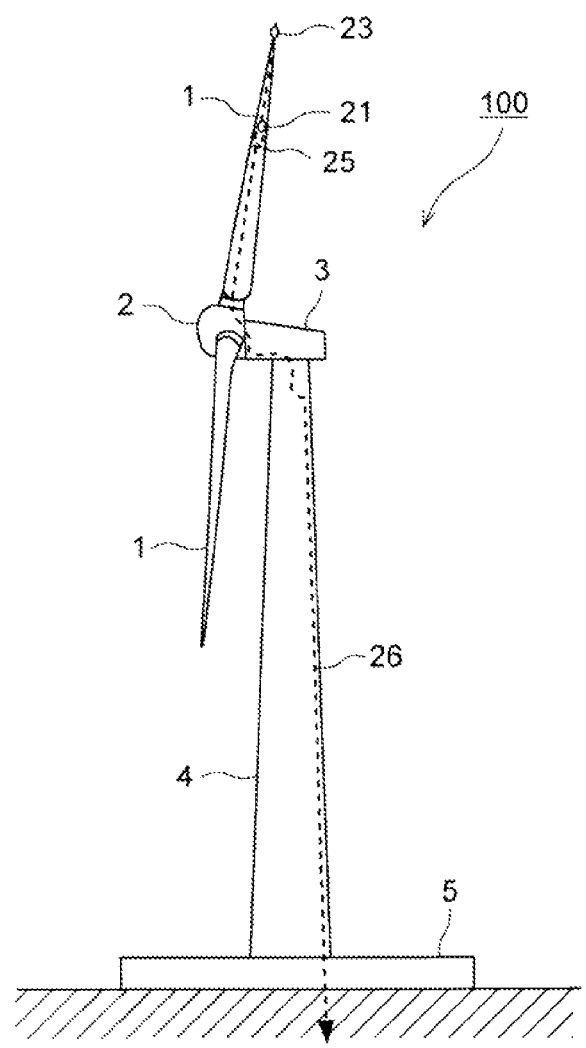
FIG. 1 shows an exemplary configuration of a wind turbine generator.

As shown in FIG. 1, a wind turbine generator 100 includes at least one blade 1 (three blades in this example), a hub to which the blade 1 is fixed, a nacelle 3 which supports a rotor including the blade 1 and the hub 2 and a tower which supports the nacelle 3 rotatably. The rotation of the rotor is inputted to a generator (not shown) to generate electric power in the generator.

The blade 1 is fixed to the hub 2 by fixing a blade root of the blade 1 to the hub by a fastening member.

The tower 4 is installed upright on a base 5. The base 5 is arranged on shore in the case of an onshore wind turbine generator or off shore in the case of an offshore wind turbine generator. The wind turbine generator 1 regarding the embodiment is applicable to both the onshore and offshore wind turbine generators.

Figure 2:
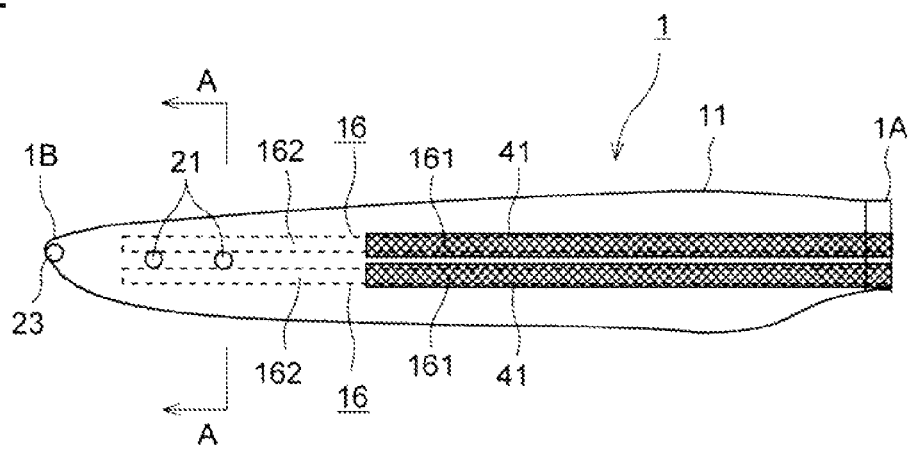
FIG. 2 is a plain view of the wind turbine blade regarding an embodiment of the present invention.

As shown in the plain view of the wind turbine blade of FIG. 2, the wind turbine blade 1 has a long shape extending from a blade root 1A connected to the hub to a blade tip 1B.

Figure 3:
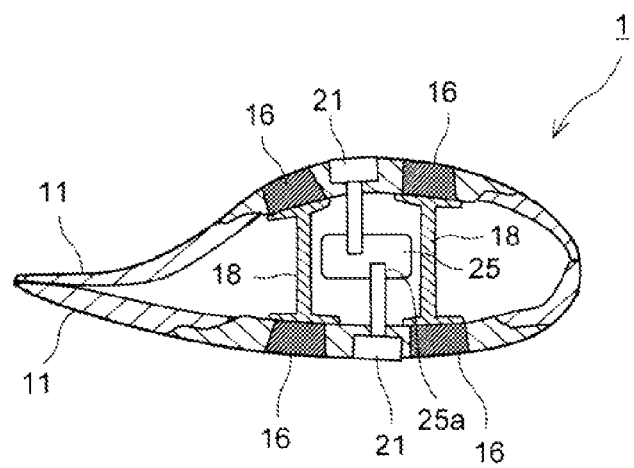
FIG. 3 is a cross-sectional view taken along a line A-A of FIG. 2.

FIG. 3 is a cross-sectional view taken along a line A-A of FIG. 2. FIG. 3 shows the wind turbine blade 1 mainly including an outer shell 11, a spar cap (main structural member) 16, a shear web (a spar) 18 and a lightning protection unit. The configuration of the lightning protection unit is described later in details.

The spar cap 16 is formed of fiber-reinforced plastic (FRP).

The outer shell 11 forms a blade shape of the wind turbine blade together with other parts. The outer shell and the other parts may be formed of, for instance, glass-fiber plastic layers or core materials. This is not limitative and parts other than the spar cap 16 may be formed simply by arranging a glass-fiber plastic laminated member, a glass-fiber plastic foam or the like.

The shear web 18 is arranged in a space inside the outer shell 11 and extends in a longitudinal direction of the blade. The shear web 18 connects the spar cap 16 disposed on the suction side and the spar cap 16 disposed on the pressure side to enhance the strength of the wind turbine blade 1. A distance between the shear web 18 disposed on the leading edge side and the shear web 18 disposed on the trailing edge side may be constant or may be changed in proportion to a chord length.

The spar cap 16 is provided between an end of the shear web 18 and a member which forms the blade shape of the wind turbine blade 1, such as the outer shell 11. The spar cap 16 is a structural member that extends in the longitudinal direction of the wind turbine blade 1. The spar cap 16 is formed by a pair of the spar cap 16 disposed on the suction side and the spar cap 16 disposed on the pressure side. In this manner, the spar cap 16 is arranged with respect to the shear web 18 and the number of the spar caps 16 is determined based on the number of the shear web 18.

Figure 4:
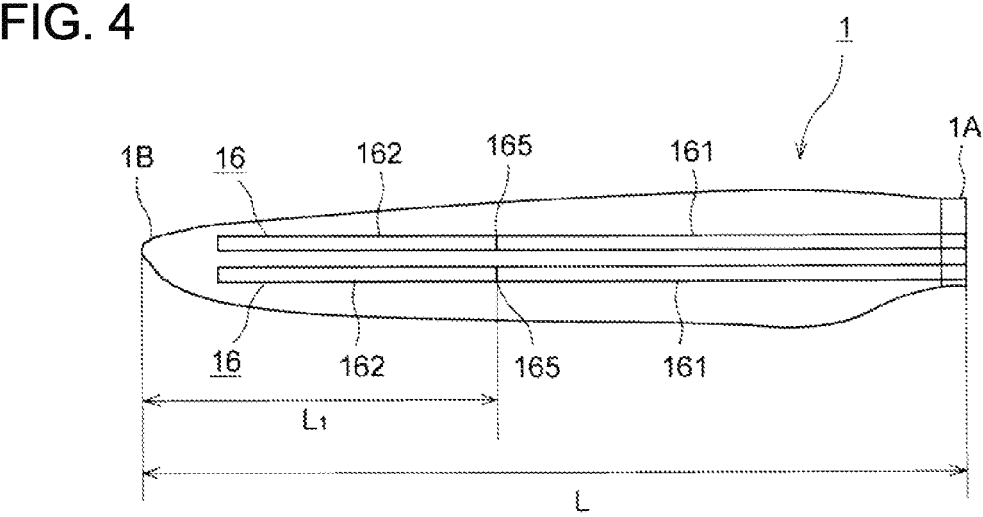
FIG. 4 is an explanatory view showing a spar cap.

The spar cap 16 has a certain width (a length in the chord direction (a vertical direction in FIG. 4) from a blade root side 1A to a blade tip side 1B. FIG. 4 is an explanatory view of the spar cap 16. The spar cap 16 is formed by a carbon-fiber plastic laminated member 161 disposed on the blade root side 1A and a glass-fiber plastic laminated member 162 disposed on the blade tip side 1B that are connected together. The carbon-fiber plastic laminated member 161 is formed by stacking a plurality of carbon fiber plastic layers. In a similar manner, the glass-fiber plastic laminated member 162 is formed by stacking a plurality of glass fiber plastic layers.

The spar cap 16 is preferably configured such that the glass-fiber plastic laminated member 162 is connected to the carbon-fiber plastic laminated member 161 at a connection part 165 which is arranged at $\frac{1}{8}$ to $\frac{1}{2}$ (L1) of an entire length L of the wind turbine blade 1 from the blade tip 1B, and the carbon-fiber plastic laminated member 161 is arranged on the blade root side 1A of the connection part 165.

Lightning tends to strike a zone L1, i.e. $\frac{1}{8}$ to $\frac{1}{2}$ of the entire length L of the wind turbine blade 1 from the blade tip 1B. Thus, by arranging the glass-fiber plastic 162 in the zone L1, it is possible to prevent the lightning from striking the carbon fiber plastic 161 disposed on the blade root side 1A. In such a case that the connection part 165 is arranged less than $\frac{1}{8}$ of the entire length L of the wind turbine blade 1 from the blade tip 1B, the carbon-fiber plastic 161 extends to the zone with higher possibility of lightning strikes, which is not preferably. In contrast, in such a case that the connection part 165 is arranged beyond $\frac{1}{2}$ of the entire length L of the wind turbine blade 1 from the blade tip 1B, the use of the glass-fiber plastic 162 increases, which interferes with reduction in weight of the wind turbine blade 1.

Figure 5:
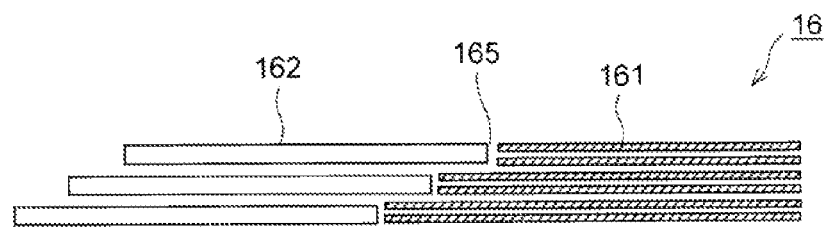
FIG. 5 is an enlarged cross-sectional view showing an example of a connection part between a carbon-fiber plastic laminated member and a glass-fiber plastic laminated member.

FIG. 5 is an enlarged cross-sectional view showing an example of the connection part 165 between the carbon-fiber plastic laminated member 161 and the glass-fiber plastic laminated member 162.

As shown in FIG. 5, preferably an abutting position of the connection part 165 between the carbon-fiber plastic laminated member 161 and the glass-fiber plastic laminated member 162 changes gradually in a thickness direction of the wind turbine blade 1 (in the vertical direction in FIG. 5).

Normally, the strength declines at the connection part between different materials. However, by gradually changing the abutting position of the connection part 165 between the carbon-fiber plastic laminated member 161 and the glass-fiber plastic laminated member 162 in the thickness direction, it is possible secure enough strength to prevent deformations such as buckling.

The spar cap 16 may be formed by respectively stacking carbon-fiber plastic layers and glass-fiber plastic layers and impregnating the stacked layers with resin to form an integral piece using vacuum impregnation. According to the method, first the carbon-fiber plastic layers and the glass-fiber plastic layers are stacked on a shaping die such that the abutting position changes gradually in the thickness direction, and then the stacked layers are covered by a bag film (a vacuum bag). Meanwhile, between the bag film and the carbon-fiber plastic layers and the glass-fiber plastic layers, a parting film and a mesh sheet are installed. Next, the bag film is suctioned to a vacuum state and resin in a liquid form is injected to the bag film and allows the resin to harden. Once the resin becomes hardened, the parting film is detached to remove the bag film and the mesh sheet, thereby obtaining the spar cap 16 formed of the carbon-fiber plastic laminated member and the glass-fiber plastic laminated member.

Figure 6:
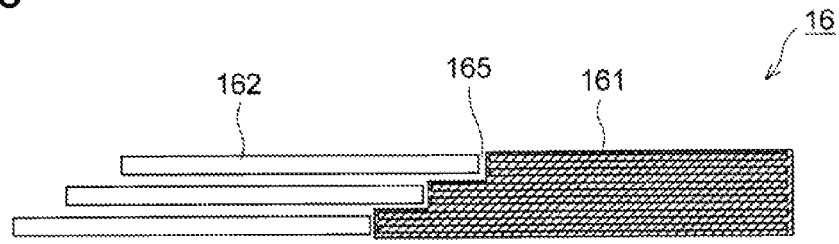
FIG. 6 is an enlarged cross-sectional view showing another example of a connection part between a carbon-fiber plastic laminated member and a glass-fiber plastic laminated member.

According to another method shown in FIG. 6, the carbon-fiber plastic laminated member may be formed first. In such case, the carbon-fiber plastic laminated member is formed such that the end of the carbon-fiber plastic laminated member changes gradually. The carbon-fiber plastic laminated member may be formed by the vacuum impregnation as described above or another shape-forming method. Then, the carbon-fiber plastic laminated member is placed on the shaping die and the glass-fiber plastic layers are stacked such that ends of the layers are abutted to the end of the carbon-fiber plastic laminated member. Over a top surface of the carbon-fiber plastic laminated member and the glass-fiber plastic layers that are abutted, the parting film and the mesh sheet are placed and then covered by the bag film to be sealed. The bag film is suctioned to a vacuum state and a resin in a liquid form is injected to the bag film to allow the resin to harden. Once the resin becomes hardened, the parting film is detached to remove the bag film and the mesh sheet, thereby obtaining the spar cap 16 formed of the carbon-fiber plastic laminated member and the glass-fiber plastic laminated member. In the shape-forming method illustrated in FIG. 6, instead of shape-forming the carbon-fiber plastic laminated member in advance, the glass-fiber plastic laminated member may be shape-formed in advance.

In this manner, the spar cap 16 can be produced easily using vacuum impregnation without using large-scale devices The lightning protection unit of the embodiment is now explained in details in reference to FIG. 2 and FIG. 3.

The lightning protection unit mainly includes receptors 21, 23 for receiving lightning, a base plate 25, a down conductor 26 and a metal member 41 covering the outer shell 11.

The metal member 41 is conductive and covers the outer shell 11 on the blade root side 1A, i.e. the side where the carbon-fiber plastic laminated member 161 is arranged. As the metal member 41, copper, aluminum or the like may be used. The metal member 41 may be in a mesh form or in a foil form. The metal member 41 is preferably connected to the base plate 25 or the down conductor 26.

By this, lightning current of the lightning striking the blade root side is directed along the metal member 41. Thus, it is possible to avoid high current passing through the carbon-fiber plastic laminated member 161. As a result, it is possible to protect the carbon-fiber plastic laminated member 161 from breakage and to prevent the wind turbine blade from being extensively damaged.

The receptors 21, 23 are described as receiving parts and formed of conductive metal material such as aluminum, copper, stainless steel or alloy of the aforementioned metals. The receptors 21, 23 are used to allow the lightning current to safely flow into the ground (into the water in the case of the offshore wind turbine generator). In the wind turbine blade 1 of the embodiment, the receptors 21, 23 are installed in the outer shell 11 on the blade tip side, i.e. the side where mainly the glass-fiber plastic laminated member 162 is arranged, in such a manner that the receptors 21, 23 are exposed to the outer surface. As the receptors 21, 23, a disc receptor 21, a rod receptor 23 or a tip receptor (not shown) may be used.

In an exemplary case illustrated in FIG. 2 and FIG. 3, the disc receptors 21 and the rod receptor 23 are provided.

The disc receptors may be embedded in the vicinity of the blade tip 1B of the wind turbine blade 1, or may be provided on a surface between the blade tip 1B and the blade root 1A of the wind turbine blade 1. Further, a plurality of the disc receptors 21 may be embedded on the suction side and the pressure side of the wind turbine bade 1.

Generally, the disc receptor 21 can be installed easily and at low cost. By embedding the disc receptors 21 near the blade tip 1B or between the blade tip 1B and the blade root 1A, the lightning protection unit can be installed to the wind turbine blade 1 easily and at low cost. As the blade tip 1B of the wind turbine blade 1 is more subjected to lightning strikes, the disc receptors 21 may be provided in a zone near the blade tip 1B so as to attract lightning strikes to the receptor 21. The lightning current is smoothly led through the base plate 25 and the down conductor 26 into the ground or the water.

The base plate 25 is formed of a conductive material and is embedded in the wind turbine blade 1. A plurality of the disc receptors 21 are fixed to the base plate 25 such that the disc receptors 21 are electrically connected to the base plate 25. Specifically, the base plate 25 has flat surfaces on the pressure side and the suction side respectively and each of the flat surfaces has a screw hole 25a where the disc receptor 21 is threadedly engaged. In contrast, the disc receptor 21 includes a lightning receiving part 21 of a disc type and a base part 21b of a shaft type which extends from the lightning receiving part 21a. The disc receptor 21 is fixed to the base plate 25 by inserting the base part 21b via a through-hole of the outer shell 11 and threadedly engaging the base part 21b into the screw hole 25a of the base plate 25 embedded inside the wind turbine blade 1.

Figure 7:
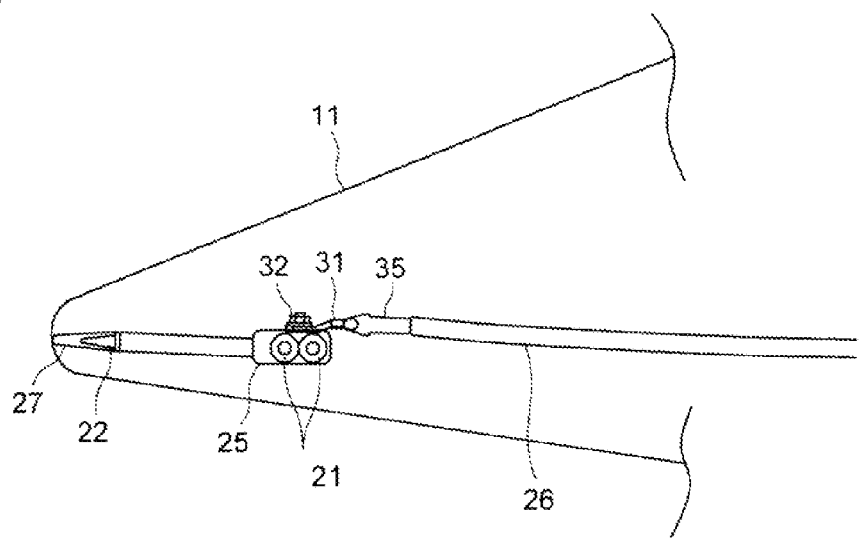
FIG. 7 is an explanatory view of a lightning protection device.

FIG. 7 is an explanatory view of the lightning protection device.

As shown in FIG. 7, the base plate 25 to which the disc receptors 21 are installed is fixed to a terminal by means of a fastening member 32. The terminal 31 and the down conductor 26 are physically connected by a heat shrinkable tube 35. The terminal and the heat shrinkable tube 35 are both conductive. Thus, the base plate 25 and the down conductor 26 are electrically connected. In this manner, the disc receptor 21 and the base plate 25 are connected to the down conductor 26 so that the heat expansion and heat shrink can be absorbed by the heat shrinkable tube 35. Thus, even when parts in the wind turbine generator 100 thermally expand or shrink due to temperature difference outside and so on, the down conductor 26 is kept electrically connected to the disc receptor 21 and the base plate 25.

Figure 8:
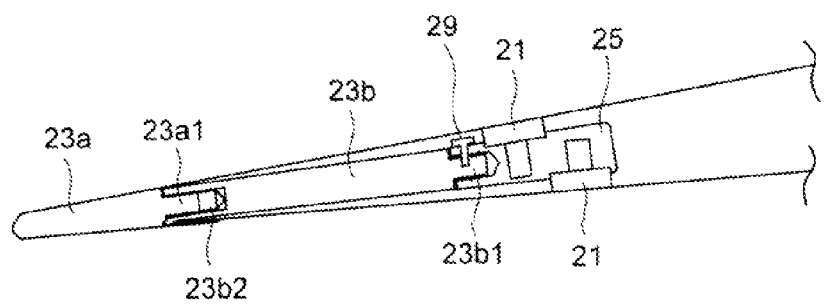
FIG. 8 shows a configuration example of a rod receptor.

FIG. 8 shows an enlarged view showing a configuration example of the rod receptor.

As shown in FIG. 8, the rod receptor 23 is provided in the blade tip part 1b and arranged toward the edge. The rod receptor 23 is formed by a lightning receiving part 23a of a rod type and a base part 23b of a shaft type extending from the lightning receiving part 23a. At one end of the base part 23 in the axial direction, a projection 23b1 is formed to be fixed to the base plate 25. At other end of the base part 23 in the axial direction, a hole 23b2 is formed and the lightning receiving part 23a is installed in the hole 23b2. At one end of the lightning receiving part 23a, a projection 23a1 is formed and the projection 23a1 is fixed to the hole 23b2 of the base part 23b. The hole 23b2 of the base part 23b is internally threaded by screw cutting, whereas the projection 23a1 of the lightning receiving part 23a is externally threaded so that the hole 23b2 and the projection 23a1 mate with each other.

The base plate 25 arranged inside the wind turbine blade 1 is formed with a hole on the blade tip side. In the hole, the projection 23b1 of the base part 23b is inserted and fixed by a conductive fastening member 29. By this, while maintaining enough conductivity, the rod receptor 23 is detachably fixed with respect to the base plate 25.

As shown in FIG. 7, the outer shell 11 of the wind turbine blade 1 is cut at the blade tip 1B to form an opening 27. Through the opening 27, the base part 23 being fastened to the base plate 25 is partially exposed. When assembling the rod receptor 23, the projection 23a1 of the lightning receiving part 23a is inserted through the opening 27 and threadedly engaged in the hole 23b2 of the base part 23b so as to connect the lightning receiving part 23a to the base part 23b.

The lightning current received at the rod receptor 23 is directed smoothly through the base plate 25 and the down conductor into the ground or into the water.

Normally, the rod receptor 23 is attachable in the edge direction of the blade 1 and thus, the rod receptor 23 can be easily arranged at the blade tip 1B of the wind turbine blade 1. Further, the rod receptor 23 is formed by the base part 23b and the lightning receiving part 23a, and the lightning receiving part 23a is inserted through the opening 27 and connected to the base part 23b fastened to the base plate 25 and thus, the rod receptor 23 can be installed easily to the wind turbine blade 1.

The down conductor 26 is explained in details in reference to FIG. 1.

As shown in FIG. 1, the down conductor 26 is conductive and extends through the hub 2, the nacelle 3 and the tower 4 into the ground or the water so as to allow the lightning current received by the disc receptor 21 or the rod receptor 23 to flow into the ground or the water. In other words, the lightning current received by the disc receptor 21 or the rod receptor 23 is directed to the base plate 25 and then grounded through the down conductor 26 into the ground or the water.

By attaching the disc receptors 21 or the rod receptor to the base plate 25 and connecting the base plate 25 to the down conductor 26 electrically, the lightning current received by the disc receptors 21 or the rod receptor 23 is directed smoothly outside the wind turbine generator 100 and it becomes easy to install the disc receptors 21 or the rod receptor 23 to the wind turbine blade 1.

Figure 9A:
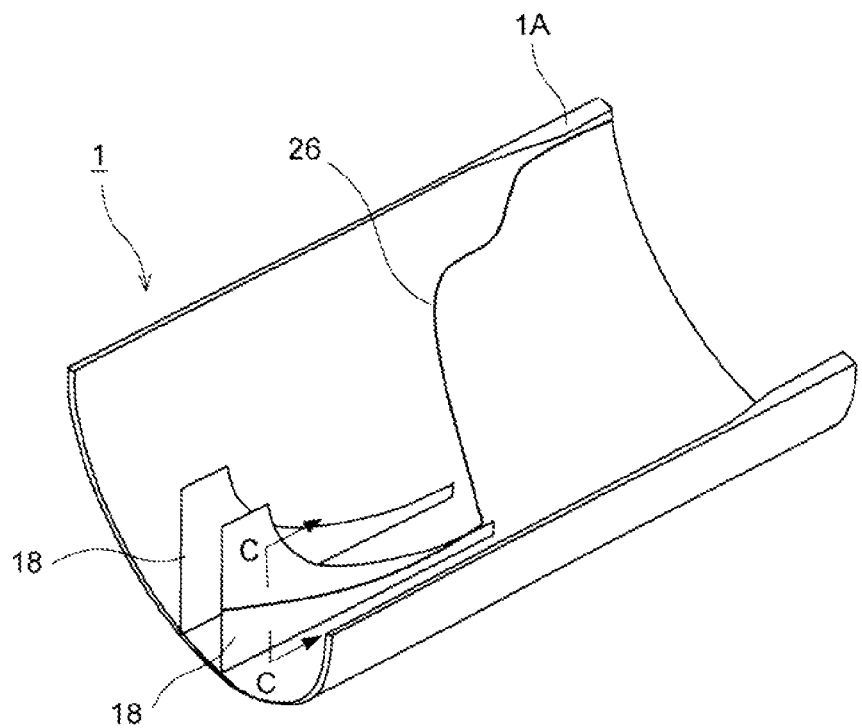
FIG. 9A is a perspective illustration of an example of an arrangement of the down conductor.
Figure 9B:
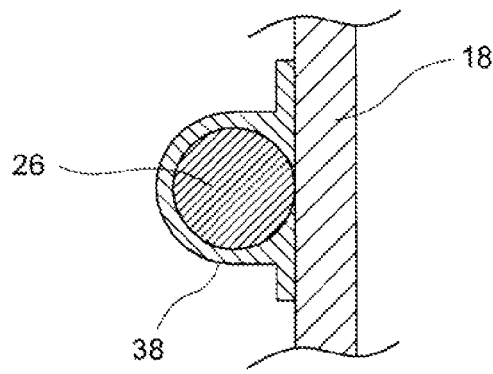
FIG. 9B is a cross-sectional view taken along a line C-C of FIG. 9A.

FIG. 9A is a perspective illustration of an example of an arrangement of the down conductor. FIG. 9B is a cross-sectional view taken along a line C-C of FIG. 9A. As shown in FIG. 9A, in an area where the shear web 18 is arranged, the down conductor 26 is preferably arranged along the shear web 18. Meanwhile, the down conductor 26 may be fixed to a surface of the shear web 18 by a fixing member 38 as shown in FIG. 9B.

In this manner, by arranging the down conductor 26 along the shear web 18, it is possible to prevent damage to the down conductor 26 caused by oscillation due to the rotation of the wind turbine blade 1. Further, the shear web 18 extends from the blade tip side to the vicinity of the blade root 1A. In a part where the shear web 18 is not arranged, the down conductor 26 is arranged along an inner periphery of the outer shell 11.

Figure 10:
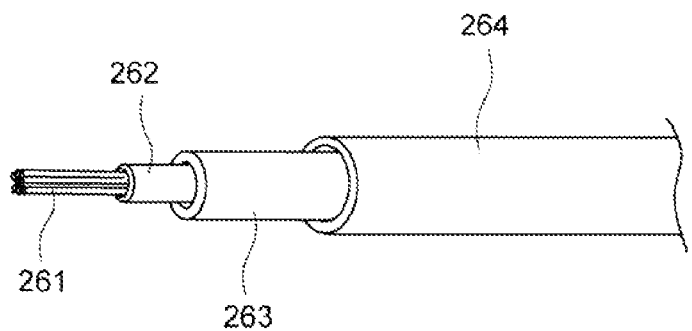
FIG. 10 shows a specific configuration example of the down conductor.

The configuration example of the down conductor 26 is explained in details in reference to FIG. 10. The down conductor 26 is formed, for instance, by a plurality of copper wires 261, a copper shield 262 covering the copper wires 261, an insulator 263 covering the copper shield 262 and a rubber jacket 264 covering the insulator 263.

The configuration of the down conductor 26 is not limited to the above configuration and the down conductor 26 may be configured in any way as long as a conductor is covered by an insulator.

According to the embodiment as described above, the spar cap 16 is configured such that the blade root side is formed of the carbon-fiber plastic 161 having high strength and light weight and the blade tip side 1B is formed of the glass-fiber plastic laminated body 162 whose strength is not as high as the carbon-fiber plastic but is high to a certain degree and which is less likely to attract lightning strikes. In this manner, it is possible to achieve high strength and light weight of the wind turbine blade 1 and also to improve lightning protection of the wind turbine blade 1. Particularly, the carbon-fiber plastic is easily damaged by lightning strike. Thus, by arranging the carbon-fiber plastic in the area other than the blade tip part 1B which is more subjected to lightning, the wind turbine blade 1 is protected from damage even when lightning strikes.

Further, the carbon-fiber plastic normally has high strength and is expensive. Thus, by using the carbon-fiber plastic only in the blade root side of the spar cap 16 where the strength is most required in the wind turbine blade 1, it is possible to reduce the production cost while still maintaining the strength of the spar cap 16.

In the above wind turbine blade, as the lightning protection unit, the receptors 21, 23 for receiving lightning are provided in the outer shell 11 on the side where the glass-fiber plastic laminated member 162 is arranged. In this manner, by providing the receptors 21, 23 on the blade tip side 1B which is more subjected to lightning strike, it is easier to collect the lightning current to the receptors 21, 23, thereby preventing lightning from striking other parts.

The above lightning protection unit includes a conductive metal member 41 which covers the outer shell 11 on the side where the carbon fiber plastic laminated member 161 is arranged. By this, it is possible to avoid direct lightning strike to the carbon-fiber plastic laminated member 161, thereby preventing the carbon-fiber plastic from being damaged. Furthermore, the lightning current flows along the carbon-fiber plastic and thus, it is possible to prevent the wind turbine blade 1 from being extensively damaged.

While the present invention has been described with reference to exemplary embodiments, it is obvious to those skilled in the art that various changes may be made without departing from the scope of the invention.

REFERENCE SIGNS LIST

1 WIND TURBINE BLADE
1A BLADE ROOT
1B BLADE TIP
2 HUB
3 NACELLE
4 TOWER
5 BASE
11 OUTER SHELL
18 SHEAR WEB
21 DISC RECEPTOR
21a LIGHTNING RECEIVING PART
21b BASE PART
23 ROD RECEPTOR
23a LIGHTNING RECEIVING PART
23b BASE PART
29 FASTENING MEMBER
31 TERMINAL
32 FIXING MEMBER
35 HEAT SHRINKABLE TUBE
41 METAL MEMBER
161 CARBON-FIBER PLASTIC LAMINATED MEMBER
162 GLASS-FIBER PLASTIC LAMINATED MEMBER
261 COPPER WIRE
262 COPPER SHIELD
263 INSULATOR
264 RUBBER JACKET

The invention claimed is:

1. A wind turbine blade having a lightning protection function, comprising:
    an outer shell;
    a spar arranged in a space inside the outer shell and extends in a longitudinal direction of the blade;
    a spar cap which is formed by a carbon-fiber plastic laminated member disposed on a blade root side and a glass-fiber plastic laminated member disposed on a blade tip side that are connected together, said spar cap supporting the spar to the outer shell; and
    a lightning protection unit comprising:
        a receptor for receiving lightning which is provided in the outer shell on a side where the glass-fiber plastic laminated member is arranged;
        a down conductor which directs lightning current received by the receptor into at least one of ground or water;
        a conductive metal member which covers a first part of the outer shell on the blade root side where the carbon fiber plastic laminated member is arranged but which does not cover a second part of the outer shell on the blade tip side where the glass-fiber plastic laminate member is arranged; and
        a base plate configured to support the receptor and disposed in a space surrounded by the second part of the outer shell on the blade tip side,
    wherein the receptor is installed in the second part of the outer shell on the blade tip side in such a manner that the receptor is exposed at an outer surface of the wind turbine blade,
    wherein the receptor is electrically connected to the down conductor via the base plate, the down conductor extends from the blade tip side toward the blade root side so as to direct the lightning current received by the receptor toward the ground or water, and
    wherein the conductive metal member is electrically connected to at least one of the down conductor or the base plate.

2. The wind turbine blade according to claim 1,
    wherein the glass-fiber plastic laminated member is connected to the carbon-fiber plastic laminated member at a connection part which is arranged at ⅛ to ½ of an entire length of the wind turbine blade from a blade tip, the carbon-fiber plastic laminated member being arranged on the blade root side of the connection part.

3. The wind turbine blade according to claim 1,
    wherein the receptor is a conductive disc receptor which is embedded in a vicinity of a blade tip of the wind turbine blade.

4. The wind turbine blade according to claim 1,
wherein the receptor is a conductive disc receptor which is provided in a surface of the wind turbine blade between a blade tip and a blade root.

5. The wind turbine blade according to claim 4,
wherein a plurality of the disc receptors are embedded on a pressure side and a suction side of the wind turbine blade, the plurality of the disc receptors being connected to the base plate, and
wherein the base plate electronically connects the plurality of the disc receptors to the down conductor.

6. The wind turbine blade according to claim 4,
wherein the down conductor is arranged in a tower supporting a hub to which the wind turbine blade is connected and allows the lightning current received by the disc receptors to flow into ground or water, and
wherein the disc receptors and the base plate are connected to the down conductor so that heat expansion and heat shrink is absorbed.

7. The wind turbine blade according to claim 6,
wherein the down conductor is connected to one of the base plate and the disc receptors via a heat shrinkable tube which is conductive.

8. The wind turbine blade according to claim 1,
wherein the down conductor is arranged along the spar.

9. The wind turbine blade according to claim 8, wherein the down conductor is attached on a surface of a shear web via a fixing member in a region where the shear web exists, whereas the down conductor is provided along an inner surface of the outer shell.

10. The wind turbine blade according to claim 1,
wherein a plurality of the receptors are provided, the plurality of the receptors including a rod receptor,
wherein the rod receptor is formed by a base part and a lightning receiving part,
wherein the base part is arranged in the space inside the outer shell in such a state that the base part is fixed to the base plate, and
wherein the outer shell of the wind turbine blade is cut at a blade tip to form an opening at the blade tip, and
wherein the lightning receiving part and the base part are coupled by inserting the lightning receiving part in the opening.

11. The wind turbine blade according to claim 10,
wherein the rod receptor and the base plate are coupled together by a conductive fastening member.

12. The wind turbine blade according to claim 1,
wherein an abutting position of a connection part between the carbon-fiber plastic laminated member and the glass-fiber plastic laminated member changes gradually in a thickness direction of the wind turbine blade.

13. The wind turbine blade according to claim 1,
wherein the spar cap is formed by respectively stacking carbon-fiber plastic layers and glass-fiber plastic layers and impregnating the stacked layers with resin to form an integral piece using vacuum impregnation.

14. A wind turbine blade having a lightning protection function, comprising:
an outer shell;
a spar arranged in a space inside the outer shell and extends in a longitudinal direction of the blade;
a spar cap which is formed by a carbon-fiber plastic laminated member disposed on a blade root side and a glass-fiber plastic laminated member disposed on a blade tip side that are connected together, said spar cap supporting the spar to the outer shell; and
a lightning protection unit comprising:
a receptor for receiving lightning which is provided in the outer shell on a side where the glass-fiber plastic laminated member is arranged;
a down conductor which directs lightning current received by the receptor into at least one of ground or water; and
a conductive metal member which covers the outer shell on the blade root side where the carbon fiber plastic laminated member is arranged; and
a base plate configured to support the receptor and disposed in a space surrounded by the outer shell on the blade tip side,
wherein the receptor is attached to the outer shell on the blade tip side in such a manner that the receptor is exposed at an outer surface of the outer shell on the blade tip side, and
wherein the receptor is electrically connected to the down conductor via the base plate, the down conductor extends from the blade tip side toward the base root side so as to direct the lightning current received by the receptor toward the ground or water, and the conductive metal member is electrically connected to the down conductor or the base plate; and
wherein the down conductor is attached on a surface of a shear web via a fixing member in a region where the shear web exists, whereas the down conductor is provided along an inner surface of the outer shell.

* * * * *